United States Patent
Nooren

(10) Patent No.: US 8,908,864 B2
(45) Date of Patent: Dec. 9, 2014

(54) SYSTEMS, METHODS, AND COMPUTER READABLE MEDIA FOR DETECTING AND MITIGATING ADDRESS SPOOFING IN MESSAGING SERVICE TRANSACTIONS

(71) Applicant: Tekelec Netherlands Group, B.V., Amsterdam (NL)

(72) Inventor: Eloy Johan Lambertus Nooren, Breda (NL)

(73) Assignee: Tekelec Netherlands Group, B.V., Amsterdam (NL)

( * ) Notice: Subject to any disclaimer, the term of this patent is extended or adjusted under 35 U.S.C. 154(b) by 105 days.

(21) Appl. No.: 13/646,538

(22) Filed: Oct. 5, 2012

(65) Prior Publication Data

US 2013/0095793 A1    Apr. 18, 2013

Related U.S. Application Data

(63) Continuation of application No. 12/722,460, filed on Mar. 11, 2010, now abandoned.

(60) Provisional application No. 61/159,323, filed on Mar. 11, 2009.

(51) Int. Cl.
| | |
|---|---|
| *H04L 29/06* | (2006.01) |
| *H04W 12/12* | (2009.01) |
| *H04W 88/18* | (2009.01) |

(52) U.S. Cl.
CPC ........... *H04W 12/12* (2013.01); *H04L 63/1441* (2013.01); *H04W 88/184* (2013.01)
USPC ........... 380/270; 380/247; 380/248; 380/271; 455/403; 455/410; 455/411; 455/445; 455/466; 709/238; 709/239; 709/242; 726/11; 726/12; 726/13; 726/14

(58) Field of Classification Search
USPC .............. 380/247–250, 270–274; 726/11–14; 455/403, 410–411, 445, 466; 709/220–245
See application file for complete search history.

(56) References Cited

U.S. PATENT DOCUMENTS 5,684,951 A   11/1997  Goldman et al.
5,768,509 A   6/1998   Gunluk
(Continued)

FOREIGN PATENT DOCUMENTS

| CN | 1625146 A | 6/2005 |
| EP | 1380183 B1 | 9/2004 |

(Continued)

OTHER PUBLICATIONS

"$3^{rd}$ Generation Partnership Project; Technical Specification Group Core Network; Unstructured Supplementary Service Data (USSD); Stage 2 (Release 8)" 3GPP TS 23.090, V8.0.0, pp. 1-32, Dec. 2008.

(Continued)

*Primary Examiner* — Madhuri Herzog
(74) *Attorney, Agent, or Firm* — Pepper Hamilton LLP

(57) ABSTRACT

Systems, methods, and computer readable media for detecting and mitigating address spoofing in messaging service transactions are disclosed. A messaging service firewall (MSF) separate from a short message service center (SMSC) receives a mobility management reply message (MMR) that is sent by a mobile location register element in response to an associated mobility management query (MMQ) and that includes a serving switch identifier. The MSF allocates a global title address (GTA) from a pool of GTAs and stores a correlation between the allocated GTA and the originating SMSC. The MSF replaces the serving switch identifier in the MMR with the allocated GTA and routes the modified MMR. The MSF then receives a messaging service message (MSM) that is addressed to the allocated GTA and that includes the purported originating SMSC. If the purported originating SMSC does not match the SMSC to which the GTA is correlated, the MSM is discarded.

12 Claims, 8 Drawing Sheets

(56) References Cited

U.S. PATENT DOCUMENTS

| | | | |
|---|---|---|---|
| 6,047,327 A | 4/2000 | Tso et al. |
| 6,091,958 A | 7/2000 | Bergkvist et al. |
| 6,308,075 B1 | 10/2001 | Irten et al. |
| 6,564,055 B1 | 5/2003 | Hronek |
| 6,577,723 B1 | 6/2003 | Mooney |
| 7,072,667 B2 | 7/2006 | Olrik et al. |
| 7,072,976 B2 | 7/2006 | Lee |
| 7,095,829 B2 | 8/2006 | Claudatos et al. |
| 7,116,972 B1 | 10/2006 | Zhang et al. |
| 7,120,455 B1 | 10/2006 | Chen et al. |
| 7,136,634 B1 | 11/2006 | Rissanen et al. |
| 7,155,243 B2 | 12/2006 | Baldwin et al. |
| 7,248,857 B1 | 7/2007 | Richardson et al. |
| 7,269,431 B1 | 9/2007 | Gilbert |
| 7,299,050 B2 | 11/2007 | Delaney et al. |
| 7,319,880 B2 | 1/2008 | Sin |
| 7,321,779 B2 | 1/2008 | Kang |
| 7,394,818 B1 | 7/2008 | Johnson et al. |
| 7,403,788 B2 | 7/2008 | Trioano et al. |
| 7,454,164 B2 | 11/2008 | Goss |
| 7,463,898 B2 | 12/2008 | Bayne |
| 7,502,335 B2 | 3/2009 | Lin |
| 7,548,756 B2 | 6/2009 | Velthuis et al. |
| 7,761,105 B2 | 7/2010 | Harding |
| 7,817,987 B2 | 10/2010 | Mian et al. |
| 7,912,908 B2 | 3/2011 | Cai et al. |
| 7,917,128 B2 | 3/2011 | Niekerk et al. |
| 8,326,265 B2 | 12/2012 | Nooren |
| 2001/0046856 A1 | 11/2001 | McCann |
| 2002/0010745 A1 | 1/2002 | Schneider |
| 2002/0013711 A1 | 1/2002 | Ahuja et al. |
| 2002/0023164 A1 | 2/2002 | Lahr |
| 2002/0095333 A1 | 7/2002 | Jokinen et al. |
| 2002/0098856 A1 | 7/2002 | Berg et al. |
| 2002/0120717 A1 | 8/2002 | Giotta |
| 2002/0126708 A1 | 9/2002 | Skog et al. |
| 2002/0147928 A1 | 10/2002 | Mahajan et al. |
| 2002/0181448 A1 | 12/2002 | Uskela et al. |
| 2002/0187794 A1 | 12/2002 | Fostick et al. |
| 2002/0193127 A1 | 12/2002 | Martschitsch |
| 2003/0003935 A1 | 1/2003 | Vesikivi et al. |
| 2003/0027591 A1 | 2/2003 | Wall |
| 2003/0032409 A1 | 2/2003 | Hutcheson et al. |
| 2003/0069991 A1 | 4/2003 | Brescia |
| 2003/0076941 A1 | 4/2003 | Tiliks et al. |
| 2003/0093314 A1 | 5/2003 | Leung et al. |
| 2003/0096625 A1 | 5/2003 | Lee et al. |
| 2003/0131263 A1 | 7/2003 | Keane et al. |
| 2004/0019695 A1 | 1/2004 | Fellenstein et al. |
| 2004/0054576 A1 | 3/2004 | Kanerva et al. |
| 2004/0137922 A1 | 7/2004 | Kang |
| 2004/0171393 A1 | 9/2004 | Harding |
| 2004/0203581 A1 | 10/2004 | Sharon et al. |
| 2004/0221011 A1 | 11/2004 | Smith et al. |
| 2004/0243719 A1 | 12/2004 | Roselinsky |
| 2005/0003838 A1 | 1/2005 | McCann et al. |
| 2005/0021666 A1 | 1/2005 | Dinnage et al. |
| 2005/0027867 A1 | 2/2005 | Mueller et al. |
| 2005/0068971 A1 | 3/2005 | Meisl et al. |
| 2005/0130685 A1 | 6/2005 | Jenkin |
| 2005/0164721 A1 | 7/2005 | Yeh et al. |
| 2005/0182968 A1* | 8/2005 | Izatt et al. ............... 713/201 |
| 2005/0232236 A1* | 10/2005 | Allison et al. ............. 370/352 |
| 2006/0047572 A1 | 3/2006 | Moore et al. |
| 2006/0120358 A1 | 6/2006 | Narasimhan et al. |
| 2006/0136560 A1 | 6/2006 | Jiang |
| 2006/0168003 A1 | 7/2006 | Vau et al. |
| 2006/0199597 A1 | 9/2006 | Wright |
| 2006/0211406 A1 | 9/2006 | Szucs et al. |
| 2006/0218613 A1 | 9/2006 | Bushnell |
| 2006/0253453 A1 | 11/2006 | Chmaytelli et al. |
| 2007/0011261 A1 | 1/2007 | Madams et al. |
| 2007/0026878 A1 | 2/2007 | Midkiff et al. |
| 2007/0072591 A1 | 3/2007 | McGary et al. |
| 2007/0088851 A1 | 4/2007 | Levkovitz et al. |
| 2007/0093260 A1 | 4/2007 | Billing et al. |
| 2007/0206747 A1 | 9/2007 | Gruchala et al. |
| 2007/0271139 A1 | 11/2007 | Fiorini |
| 2007/0275738 A1 | 11/2007 | Hewes et al. |
| 2007/0281718 A1 | 12/2007 | Nooren |
| 2007/0282954 A1 | 12/2007 | Kim et al. |
| 2007/0287463 A1 | 12/2007 | Wilson |
| 2007/0297413 A1* | 12/2007 | Uskela et al. ............... 370/392 |
| 2008/0004046 A1 | 1/2008 | Mumick et al. |
| 2008/0004047 A1* | 1/2008 | Hill et al. ............... 455/466 |
| 2008/0026778 A1* | 1/2008 | Cai et al. ............... 455/466 |
| 2008/0031196 A1 | 2/2008 | Marathe et al. |
| 2008/0045246 A1 | 2/2008 | Murtagh et al. |
| 2008/0051066 A1 | 2/2008 | Bandhole et al. |
| 2008/0101370 A1 | 5/2008 | Marsico et al. |
| 2008/0113677 A1 | 5/2008 | Madnawat |
| 2008/0125117 A1* | 5/2008 | Jiang ............... 455/433 |
| 2008/0139170 A1 | 6/2008 | Kahn |
| 2008/0161028 A1 | 7/2008 | Fondé et al. |
| 2008/0171549 A1 | 7/2008 | Hursey et al. |
| 2008/0207181 A1 | 8/2008 | Jiang |
| 2008/0243619 A1 | 10/2008 | Sharman et al. |
| 2008/0285735 A1 | 11/2008 | Ravishankar et al. |
| 2008/0287150 A1 | 11/2008 | Jiang et al. |
| 2009/0017794 A1 | 1/2009 | Wilson |
| 2009/0047980 A1 | 2/2009 | Wilson |
| 2009/0111489 A1 | 4/2009 | Wilson |
| 2010/0105355 A1 | 4/2010 | Nooren |
| 2010/0210292 A1 | 8/2010 | Nooren |
| 2010/0233992 A1 | 9/2010 | Nooren |
| 2010/0235911 A1 | 9/2010 | Nooren |
| 2013/0137471 A1 | 5/2013 | Nooren |
| 2013/0178238 A1 | 7/2013 | Nooren |

FOREIGN PATENT DOCUMENTS

| | | |
|---|---|---|
| EP | 1705885 B1 | 9/2006 |
| EP | 1906682 A1 | 4/2008 |
| KR | 10-2003-0000491 A | 1/2003 |
| KR | 10-0600335 B1 | 7/2006 |
| KR | 10-2008-0006225 A | 1/2008 |
| KR | 10-2008-0054737 A | 6/2008 |
| KR | 10-2008-0111175 A | 12/2008 |
| WO | WO 99/49686 A2 | 9/1999 |
| WO | WO 01/06679 A1 | 1/2001 |
| WO | WO 02/39765 A1 | 5/2002 |
| WO | WO 02/063849 A1 | 8/2002 |
| WO | WO 02/078381 A1 | 10/2002 |
| WO | WO 03/001770 A2 | 1/2003 |
| WO | WO 03/088690 A1 | 10/2003 |
| WO | WO 2004/100470 A1 | 11/2004 |
| WO | WO 2004/104735 A2 | 12/2004 |
| WO | WO 2004/105405 A2 | 12/2004 |
| WO | WO 2005/091656 A1 | 9/2005 |
| WO | WO 2005/101872 A1 | 10/2005 |
| WO | WO 2007/080570 A1 | 7/2007 |
| WO | WO 2007/084503 A2 | 7/2007 |
| WO | WO 2007/141762 A1 | 12/2007 |
| WO | WO 2008/057206 A2 | 5/2008 |
| WO | WO 2008/057259 A2 | 5/2008 |
| WO | WO 2008/085830 A1 | 7/2008 |
| WO | WO 2008/130565 A1 | 10/2008 |
| WO | WO 2010/045646 A | 4/2010 |
| WO | WO 2010/094038 A2 | 8/2010 |
| WO | WO 2010/105043 A2 | 9/2010 |
| WO | WO 2010/105099 A2 | 9/2010 |

OTHER PUBLICATIONS

"3$^{rd}$ Generation Partnership Project; Technical Specification Group Services and System Aspects; Unstructured Supplementary Service Data (USSD); Stage 1 (Release 8)" 3GPP TS 22.090, V8.0.0, pp. 1-10, Dec. 2008.

"3$^{rd}$ Generation Partnership Project; Technical Specification Group Core Network and Terminals; Study into routing of MT-SMs via the HPLMN (Release 7)" 3GPP TR 23.840 V7.1.0, Mar. 2007.

(56) References Cited

OTHER PUBLICATIONS

"3rd Generation Partnership Project; Technical Specification Group Terminals; Technical Realization of the Short Message Service (SMS) (Release 1998)" 3GPP TS 03.40 V7.5.0, pp. 1-118, Dec. 2001.
"3rd Generation Partnership Project; Technical Specification Group Terminals; Technical Realization of Cell Broadcase Service (CBS) (Release 1998)" 3GPP TS 03.41 V7.4.0, pp. 1-31, Sep. 2000.
"Digital Cellular Telecommunications System (Phase 2+); Mobil Application Part (MAP) Specification (3GPP TS 09.02 Version 7.15.0 Release 1998)" GSM (Global System for Mobile Communications), ETSI TS 100 974, V7.15.0 pp. 1-118, Mar. 2004.
"Digital Cellular Telecommunications System (Phase 2+); Universal Mobile Telecommunications System (UMTS); Technical Realization of Short Message Service (SMS)" 3GPP TS 23.040, Version 9.1.0, Release 9, Jan. 2010.
"Messaging Service Suite" http://www.telogic.com.sg/Telecom_Sol_MessagingService.html, Telogic Co. (Copyright 2006).
"Push Access Protocol" Apr. 29, 2001, Wireless Application Protocol, WAP-247-PAP-20010429.a, Version Apr. 29, 2001, pp. 1-49.
International Search Report and Written Opinion for PCT/US 2004/014734 dated Feb. 10, 2006.
International Search Report and Written Opinion for PCT/US 2007/22664 dated Mar. 14, 2008.
International Search Report and Written Opinion for PCT/US 2007/22440 dated Mar. 14, 2008.
International Search Report and Written Opinion for PCT/US 2008/000038 dated May 21, 2008.
International Search Report and Written Opinion for PCT/US 2009/061187 dated May 17, 2010.
International Search Report and Written Opinion for PCT/US 2010/027043 dated Oct. 19, 2010.
International Search Report and Written Opinion for PCT/US 2010/024317 dated Oct. 4, 2010.
International Search Report and Written Opinion for PCT/US 2010/026964 dated Sep. 27, 2010.
ROACH "Session Initiation Protocol (SIP)—Specific Event Notification" Jun. 2002, Network Working Group RFC 3265.

\* cited by examiner

SYSTEMS, METHODS, AND COMPUTER READABLE MEDIA FOR DETECTING AND MITIGATING ADDRESS SPOOFING IN MESSAGING SERVICE TRANSACTIONS

PRIORITY CLAIM

This application claims the benefit of U.S. Provisional Patent Application Ser. No. 61/159,323, filed Mar. 11, 2009; the disclosure of which is incorporated herein by reference in its entirety.

TECHNICAL FIELD

The subject matter described herein relates to methods and systems for detecting fraudulent activity within a telecommunications network. More particularly, the subject matter described herein relates to systems, methods, and computer readable media for detecting and mitigating address spoofing in messaging service transactions.

BACKGROUND

A telecommunications network may support one or more messaging services. One example messaging service is the short message service, or SMS. SMS allows the communication of short text messages between mobile communications devices, such as mobile phones, personal digital assistants, and the like. For brevity, the term "mobile phone" is hereinafter used to generically refer to any type of mobile communications device, although the subject matter described herein is not so limited.

The delivery of an SMS message is a two-step process. First, if the receiver is a mobile subscriber, the receiver's current location—more specifically, the identity of the mobile switching center (MSC) that is currently serving the receiver's mobile phone, referred to as the serving MSC—must be determined. Second, the MT/SM message is forwarded to the serving MSC, which will transmit the MT/SM message to the receiver's mobile phone.

FIG. 1A is a block diagram illustrating processing of an MT/SM message in a conventional signaling system #7 (SS7) based telecommunications network according to the steps described above. Telecommunications network 100 includes a short messaging service center (SMSC) node 102 for processing SMS messages, such as MT/SM message 104, which was sent from a mobile subscriber, sender 106, and intended for another mobile subscriber, receiver 108. To determine the current location of receiver 108, SMSC 102 sends a send routing information for short message (SRI_SM) message 110 to the home location register (HLR) 112 which maintains the current location of receiver 108. HLR 112 sends a response message, such as SRI_SM_ACK message 114, to SMSC 102. SRI_SM_ACK message 114 includes information identifying subscriber 108, such as the (IMSI) for subscriber 108. In the conventional system illustrated in FIG. 1, the information identifying subscriber 108 is subscriber 108's IMSI number, represented in FIG. 1 as "IMSI#". SRI_SM_ACK message 114 also includes information identifying the MSC currently serving receiver 108. In the conventional system illustrated in FIG. 1A, MSC 116 is currently serving receiver 108, and MSC 116 is identified by its network address, represented in FIG. 1 as "ADDR1". SMSC 102 then issues a MT_FORWARD_SM message 118 to MSC 116, which delivers what is essentially the original MT/SM message 104' to receiver 108.

In the scenario where sender 106 is in a first mobile telecommunications network and receiver 108 is in a second mobile telecommunications network, the SMS message is communicated from the first network, hereinafter referred to as the originating network, to the second network, hereinafter referred to as the terminating network. In the conventional network illustrated in FIG. 1A, SMSC 102 is an entity in the originating network and HLR 112 and MSC 116 are entities in a terminating network that is different from the originating network.

It is not uncommon for a terminating network to charge a termination fee for receiving and processing SMS messages that originate from other networks. The terminating network may determine the identity of the originating network—and thus determine whom to charge—by looking at the source address fields within either SRI_SM message 110 or MT_FORWARD_SM message 118. Moreover, both SRI_SM message 110 and MT_FORWARD_SM message 118 contain the address of SMSC 102 at two layers of the signaling message protocol, and thus within two separate sets of message parameters or fields: the signaling connection control part (SCCP) layer and the mobile application part (MAP) layer. Table 1, below, lists the parameter names for the two messages and the two layers.

TABLE 1

SMSC Addresses Contained Within Signaling Messages

| Operation | SMSC address at SCCP layer | SMSC parameter at MAP layer |
| --- | --- | --- |
| SendRoutingInfoForSm | CGPA GTA | serviceCentreAddress |
| MtForwardSm | CGPA GTA | SM-RP-OA parameter |

In the conventional telecommunication network illustrated in FIG. 1A, MSC 116 may, upon receiving MT_FORWARD_SM message 118, determine that the message originated from a different network and, in response to that determination, extract the SMSC address from MT_FORWARD_SM message 118. The terminating network may then identify the network to which SMSC 102 belongs and charge a termination fee 120 to the identified originating network.

To avoid being charged a termination fee for SMS messages sent to the terminating network, unscrupulous originating network operators may "spoof" (falsify) the contents of the SMS message so that the SMS message appears to have come from a third telecommunications network rather than from the actual originating network.

FIG. 1B is a block diagram illustrating MT/SM spoofing in the conventional telecommunications network of FIG. 1A. Elements of FIG. 1B are essentially identical to their like-numbered counterparts in FIG. 1A, and therefore their descriptions will not be repeated here. In addition to the originating and terminating networks of FIG. 1A, now labeled as "NW1" and "NW2", respectively, FIG. 1B also includes a third network, "NW3", which contains its own SMSC 122. In the scenario illustrated in FIG. 1B, terminating network NW2 receives from originating network NW1 an SMS message, such as MT_FORWARD_SM message 118', with a spoofed origination address ("ADDR3") that falsely indicates that the SMS message came from SMSC 122. The terminating network then incorrectly charges termination fee 120' to the third telecommunications network NW3 rather than to the actual originating network NW1. In this manner, an unscrupulous network operator (e.g., the operator of NW1)

may fraudulently avoid termination fees that would otherwise be imposed upon it by the terminating network NW2.

This is a particularly pernicious problem in light of unwanted solicitations, colloquially called "spam", which flood the world's email systems daily with millions or billions of unwanted messages. The entities that generate these unwanted communications have recently started sending spam via SMS. Spam SMS messages are particularly grievous since the subscriber is often charged a fee for every SMS message received, which results in a subscriber not only receiving unwanted and often offensive SMS messages, but the subscriber having to pay for these unwanted SMS messages. Some subscribers may have plans that have a finite number of SMS messages that may be sent or received within a billing period, where the subscriber is charged a steep fee for every additional message sent or received during that billing period. In a worst case scenario, the charge levied upon the subscriber due to the additional SMS messages may be many times more than the cost of the original subscription. Network operators may then face the prospect of absorbing the cost themselves or risk losing subscribers. In this scenario particularly, the network operator would desire to detect and discard spoofed MT/SM messages.

Accordingly, in light of the potential for fraudulent spoofing of SMS addresses, there exists a need for systems, methods, and computer readable media for detecting and mitigating address spoofing in messaging service transactions.

SUMMARY

According to one aspect, the subject matter described herein includes a method for detecting and mitigating address spoofing in a messaging service transaction. A messaging service firewall separate from a short message service center (SMSC) and implemented on a platform including at least one processor receives a mobility management reply message that is sent by a mobile location register element in response to an associated mobility management query, the mobility management query and the mobility management reply message being associated with a mobility management transaction, the mobility management reply message including a message service recipient identifier and a serving switch identifier. The messaging service firewall allocates a global title address (GTA) from a pool of global title addresses within a range of global title addresses assigned to the firewall, and stores a correlation between the allocated GTA and an originating SMSC identifier. The messaging service firewall replaces the serving switch identifier in the mobility management reply message with the allocated GTA and routes the modified mobility management reply message. The messaging service firewall then receives a message service message associated with the mobility management transaction, the messaging service message being addressed to the allocated GTA, and determines the originating SMSC identifier to which the allocated GTA is correlated. The messaging service firewall compares SMSC identifier information extracted from the messaging service message with the originating SMSC identifier to which the allocated GTA is correlated to determine if the messaging service message contains spoofed address information. In response to determining that the messaging service message contains spoofed address information, the messaging service firewall discards the messaging service message.

According to another aspect, the subject matter described herein includes a method for detecting and mitigating address spoofing in a messaging service transaction. A messaging service firewall separate from a short message service center (SMSC) and implemented on a platform including at least one processor receives a mobility management query message associated with a message delivery transaction that is sent by an originating SMSC element, where the mobility management query message includes a message service recipient identifier and a first originating SMSC identifier. The messaging service firewall generates a mobility management reply message in response to the query message, the reply message including a least a portion of the first originating SMSC identifier in one or more parameters of the reply message that trigger the originating SMSC to echo the parameters in a subsequent message associated with the message delivery transaction. The messaging service firewall receives a messaging service message associated with the message delivery transaction, where the messaging service message includes the echoed parameters, and extracts the echoed parameters from the messaging service message. The messaging service firewall compares SMSC identifier information extracted from the messaging service message with SMSC identifier information contained in the routing label of the received messaging service message to determine if the messaging service message contains spoofed address information. In response to determining that the messaging service message contains spoofed address information, the messaging service firewall discards the messaging service message.

According to yet another aspect, the subject matter described herein includes a system for detecting and mitigating address spoofing in messaging service transactions. The system includes a messaging service firewall separate from a short message service center (SMSC) and implemented on a platform including at least one processor. The messaging service firewall includes a network interface for sending and receiving signaling messages and a spoofing detection module for: receiving, from the network interface, a mobility management reply message that is sent by a mobile location register element in response to an associated mobility management query, where the mobility management reply message includes a message service recipient identifier and a serving switch identifier; allocating a global title address (GTA) from a pool of global title addresses within a range of global title addresses assigned to the firewall; generating and storing a correlation record that associates the GTA with an originating SMSC identifier; replacing the serving switch identifier in the reply message with the firewall GTA; and routing the modified reply message. The spoofing detection module is also for: receiving, from the network interface, a message service message including the allocated GTA and using the allocated GTA to locate the correlation record; comparing SMSC identifier information extracted from the messaging service message with SMSC identifier information contained in the correlation record to determine if the messaging service message contains spoofed address information; and, in response to determining that the messaging service message contains spoofed address information, discarding the messaging service message.

According to yet another aspect, the subject matter described herein includes a system for detecting and mitigating address spoofing in messaging service transactions. The system includes a messaging service firewall separate from a short message service center (SMSC) and implemented on a platform including at least one processor. The messaging service firewall includes a network interface for sending and receiving signaling messages and a spoofing detection module for receiving, from the network interface, a mobility management query message associated with a message delivery transaction that is sent by an originating SMSC element, where the mobility management query message includes a message service recipient identifier and a first originating SMSC identifier, and generating a mobility management reply message, in response to the query message, that includes a least a portion of the first originating SMSC identifier in one or more parameters of the reply message that trigger the originating SMSC to echo the parameters in a subsequent message associated with the message delivery transaction. The spoofing detection module is also for receiving, from the network interface, a messaging service message associated with the message delivery transaction, where the messaging service message includes the echoed parameters; extracting the echoed parameters in the messaging service message; comparing SMSC identifier information extracted from the messaging service message with SMSC identifier information contained in the routing label of the received messaging service message to determine if the messaging service message contains spoofed address information; and, in response to determining that the messaging service message contains spoofed address information, discarding the messaging service message.

The subject matter described herein for detecting and mitigating address spoofing in messaging service transactions may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which:

FIG. 1A illustrates normal (non-fraudulent) MT/SM processing, while FIG. 1B illustrates MT/SM address spoofing;

DETAILED DESCRIPTION

In accordance with the subject matter disclosed herein, systems, methods, and computer readable media are provided for detecting and mitigating address spoofing in messaging service transactions.

Reference will now be made in detail to exemplary embodiments of the present invention, examples of which are illustrated in the accompanying drawings. Wherever possible, the same reference numbers will be used throughout the drawings to refer to the same or like parts.

Figure 1A:
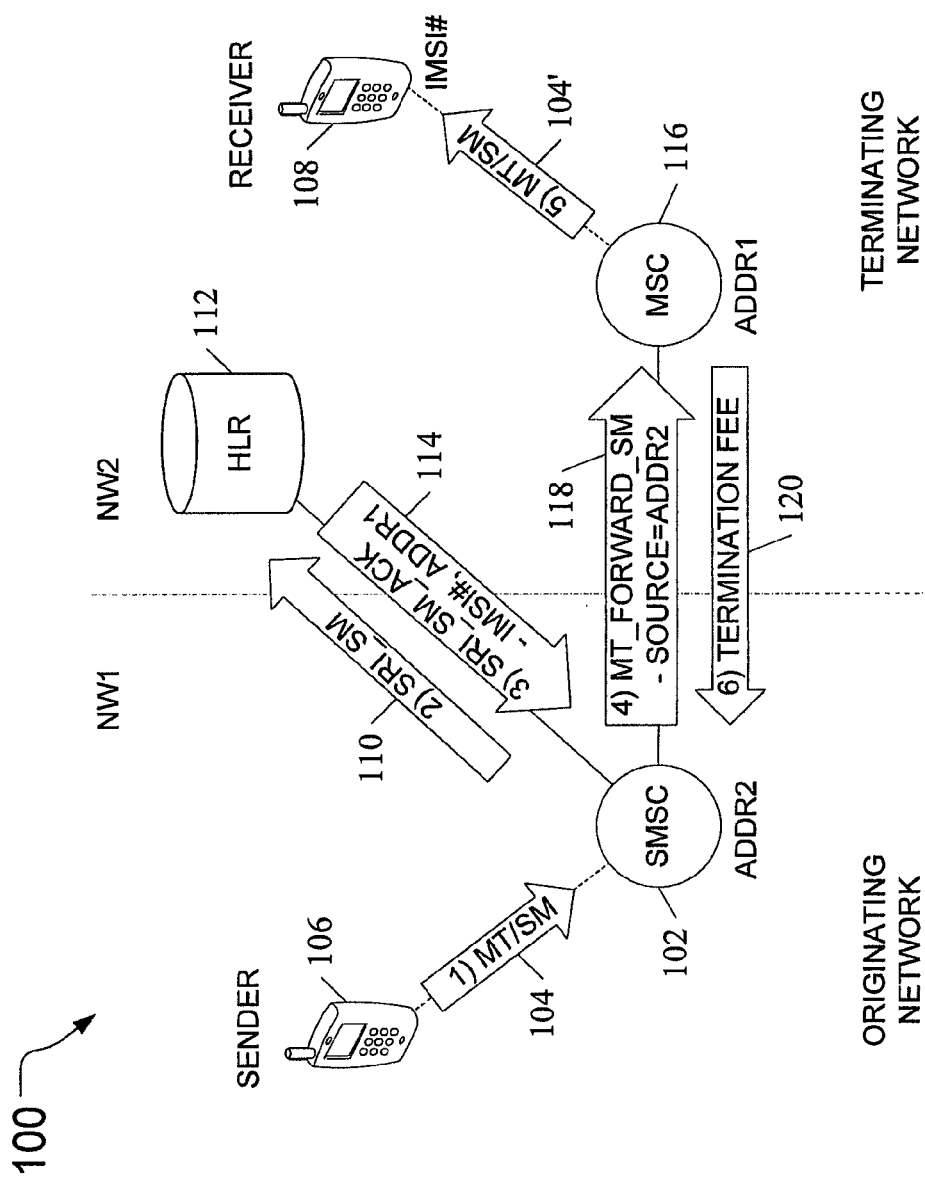
FIGS. 1A and 1B are block diagrams illustrating processing of an MT/SM message in a conventional signaling system #7 (SS7) based telecommunications network.
Figure 1B:
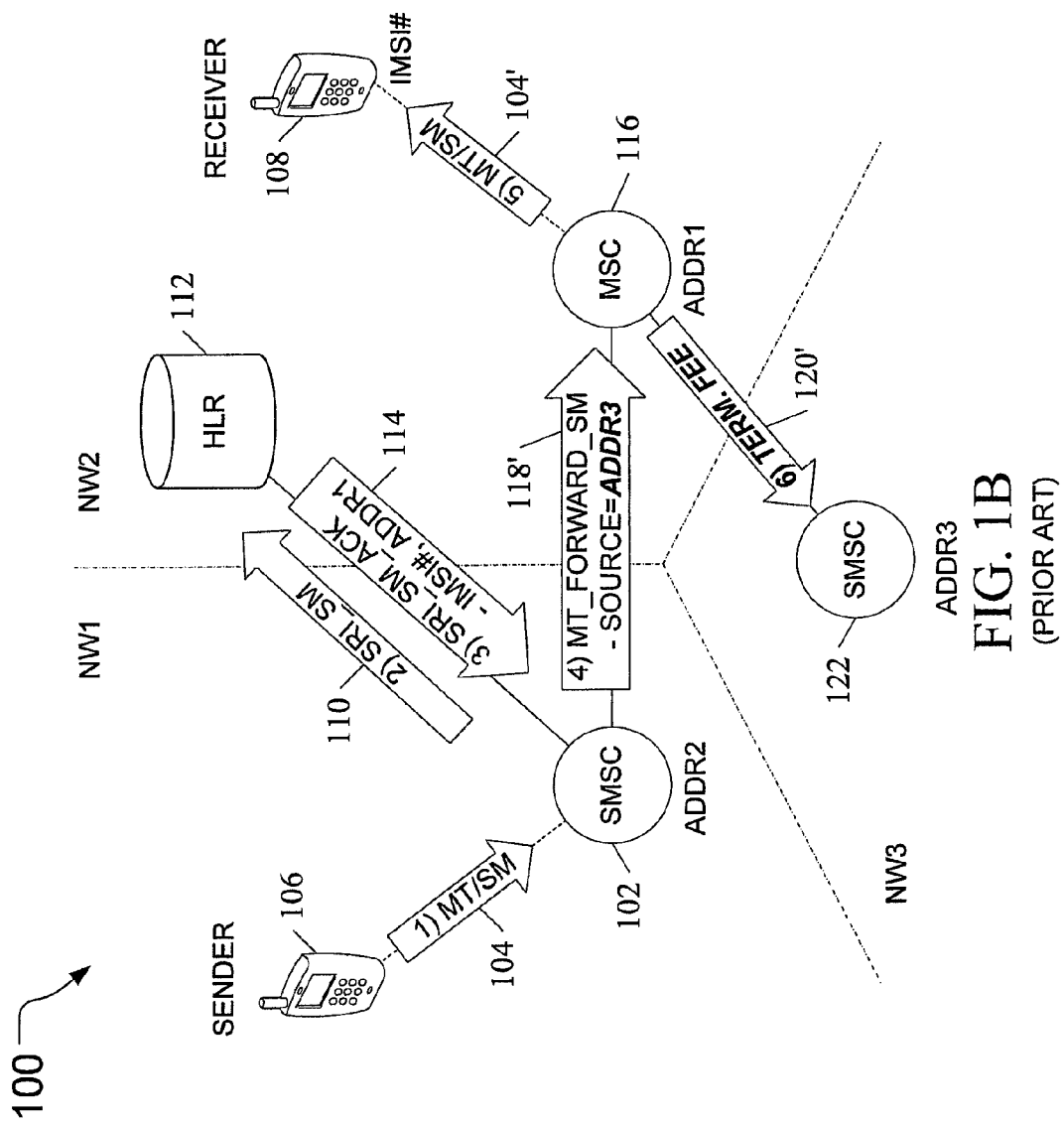
Figure 2:
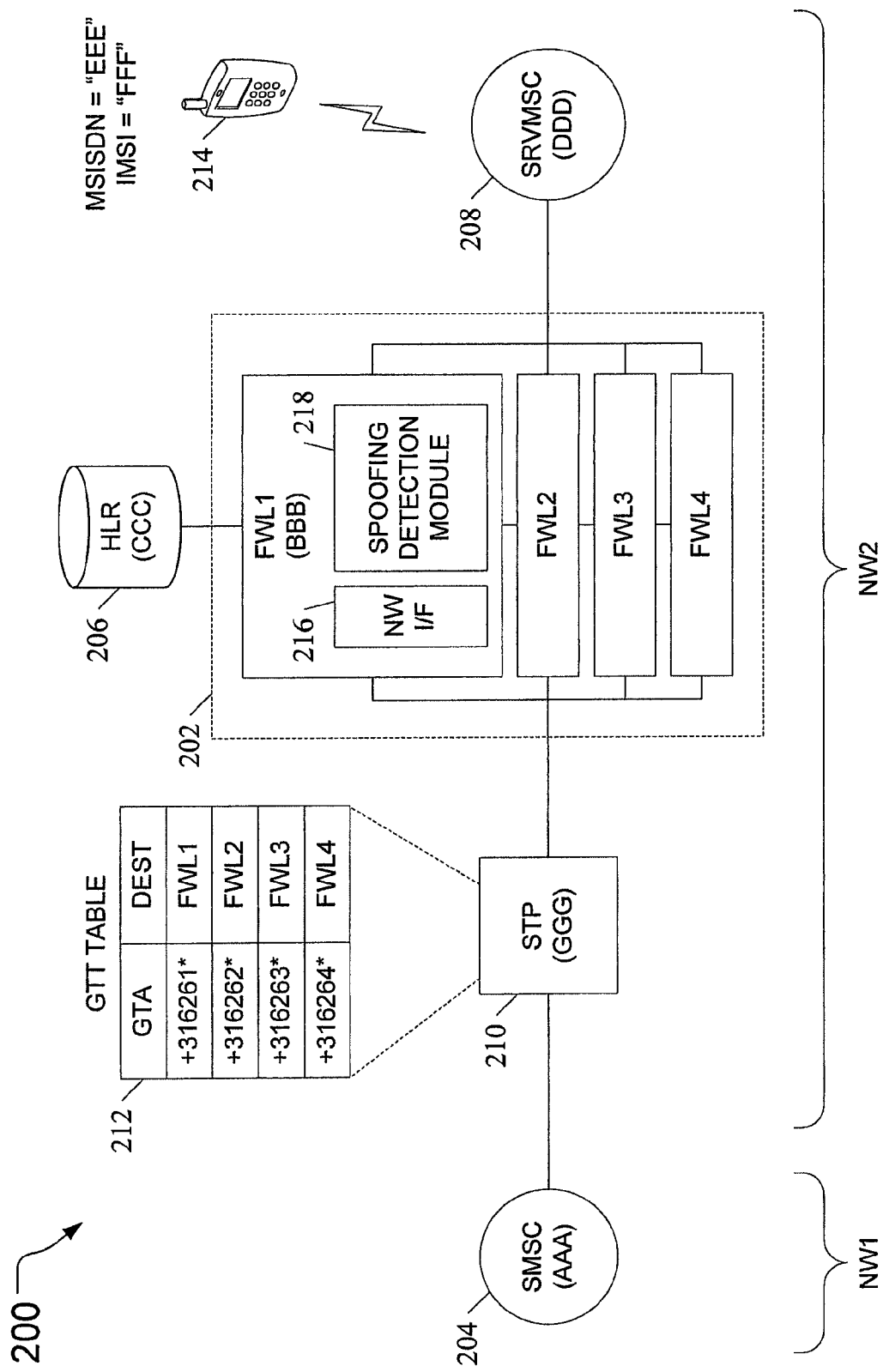
FIG. 2 is a block diagram illustrating an exemplary system for detecting and mitigating address spoofing in messaging service transactions according to an embodiment of the subject matter described herein.

FIG. 2 is a block diagram illustrating an exemplary system for detecting and mitigating address spoofing in messaging service transactions according to an embodiment of the subject matter described herein. System 200 includes one more firewall nodes 202 for detecting and mitigating address spoofing. In the embodiment illustrated in FIG. 2, system 200 includes four firewall nodes 202, labeled "FWL1", "FWL2", "FWL3", and "FWL4", respectively. Firewall nodes 202 intercept and process SMS-related messages that may be sent by a short message service center (SMSC) 204. Example messages that may be intercepted include: send routing information for short message (SRI_SM) messages that are sent by SMSC 204 to a home location register (HLR) 206; mobile-terminated forward short message (MT_F_SM) messages that are sent by SMSC 204 to a serving mobile switching center (SRVMSC) 208; and other types of SMS messages.

In the embodiment illustrated in FIG. 2, a signaling message routing node, such as signal transfer point (STP) 210, may distribute incoming SMS-related messages to firewall nodes 202. In one embodiment, STP 210 may assign incoming SMS-related messages to firewall nodes 202 based on the identity of the intended receiver, generically referred to as the "called party" or CDPA. The called party may be identified using a global title address (GTA). In one embodiment, STP 210 may make use of a table, database, or other appropriate construct, such as global title translation (GTT) table 212, that maps a range of called party addresses to particular firewall nodes 202. In the embodiment illustrated in FIG. 2, GTT table 212 maps called parties to firewall nodes 202 according to the called party's GTA. In GTT table 212, SMS-related messages that involve called parties with a GTA that matches the pattern "+316261*" are assigned or forwarded to FWL1 for processing, SMS-related messages that involve called parties with a GTA that matches the pattern "+316262" are assigned or forwarded to FWL2 for processing, and so on. Each of firewall nodes 202 may access HLR 206 and each may communicate with STP 210, SRVMSC 208, or other telecommunication network nodes.

For the purposes of illustration only and without limitation, system 200 in FIG. 2 includes two separate telecommunications networks: a first network (NW1), which contains SMSC 204; and a second network (NW2), which contains every other element illustrated in FIG. 2. In the examples of MT/SM spoofing detection and mitigation below, NW1 may also be referred to as the originating network and NW2 may also be referred to as the terminating network. For ease of illustration and without limitation, some of the nodes within system 200 will be given network identifiers, e.g., network addresses, in simplified form. For example, in the embodiment illustrated in FIG. 2, SMSC 204 has a network address of "AAA"; of the firewall nodes 202, FWL1 has a network address of "BBB";

HLR 206 has a network address of "CCC"; and SRVMSC 208 has a network address of "DDD". In the embodiment illustrated in FIG. 2, a mobile subscriber (MS) 214 is being served by SRVMSC 208. MS 214 is identified by both a mobile subscriber integrated services digital network (MSISDN) number, "EEE", and an international mobile subscriber identity (IMSI) number, "FFF". STP 210 has a network address of "GGG". The operation of system 200 will now be described. In the embodiment, illustrated in FIG. 2, each firewall node 202 includes a network interface (NWIF) 216 for sending and receiving signaling messages, and a spoofing detection module (SDM) 218.

In one embodiment, spoofing detection module 218 is for: receiving, from the network interface, a mobility management query message associated with a message delivery transaction that is sent by an originating SMSC element, where the mobility management query message includes a message service recipient identifier and a first originating SMSC identifier; generating a mobility management reply message, in response to the query message, that includes a least a portion of the first originating SMSC identifier in one or more parameters of the reply message that trigger the originating SMSC to echo the parameters in a subsequent message associated with the message delivery transaction; receiving, from the network interface, a messaging service message associated with the message delivery transaction, where the messaging service message includes the echoed parameters; extracting the echoed parameters in the messaging service message; comparing SMSC identifier information extracted from the messaging service message with SMSC identifier information contained in the routing label of the received messaging service message to determine if the messaging service message contains spoofed address information; and, in response to determining that the messaging service message contains spoofed address information, discarding the messaging service message.

In an alternative embodiment, spoofing detection module 218 is for: receiving, from the network interface, a mobility management query message associated with a message delivery transaction that is sent by an originating SMSC element, where the mobility management query message includes a message service recipient identifier and a first originating SMSC identifier; generating a mobility management reply message, in response to the query message, that includes a least a portion of the first originating SMSC identifier in one or more parameters of the reply message that trigger the originating SMSC to echo the parameters in a subsequent message associated with the message delivery transaction; receiving, from the network interface, a messaging service message associated with the message delivery transaction, where the messaging service message includes the echoed parameters; extracting the echoed parameters in the messaging service message; comparing SMSC identifier information extracted from the messaging service message with SMSC identifier information contained in the routing label of the received messaging service message to determine if the messaging service message contains spoofed address information; and, in response to determining that the messaging service message contains spoofed address information, discarding the messaging service message.

Figure 3A:
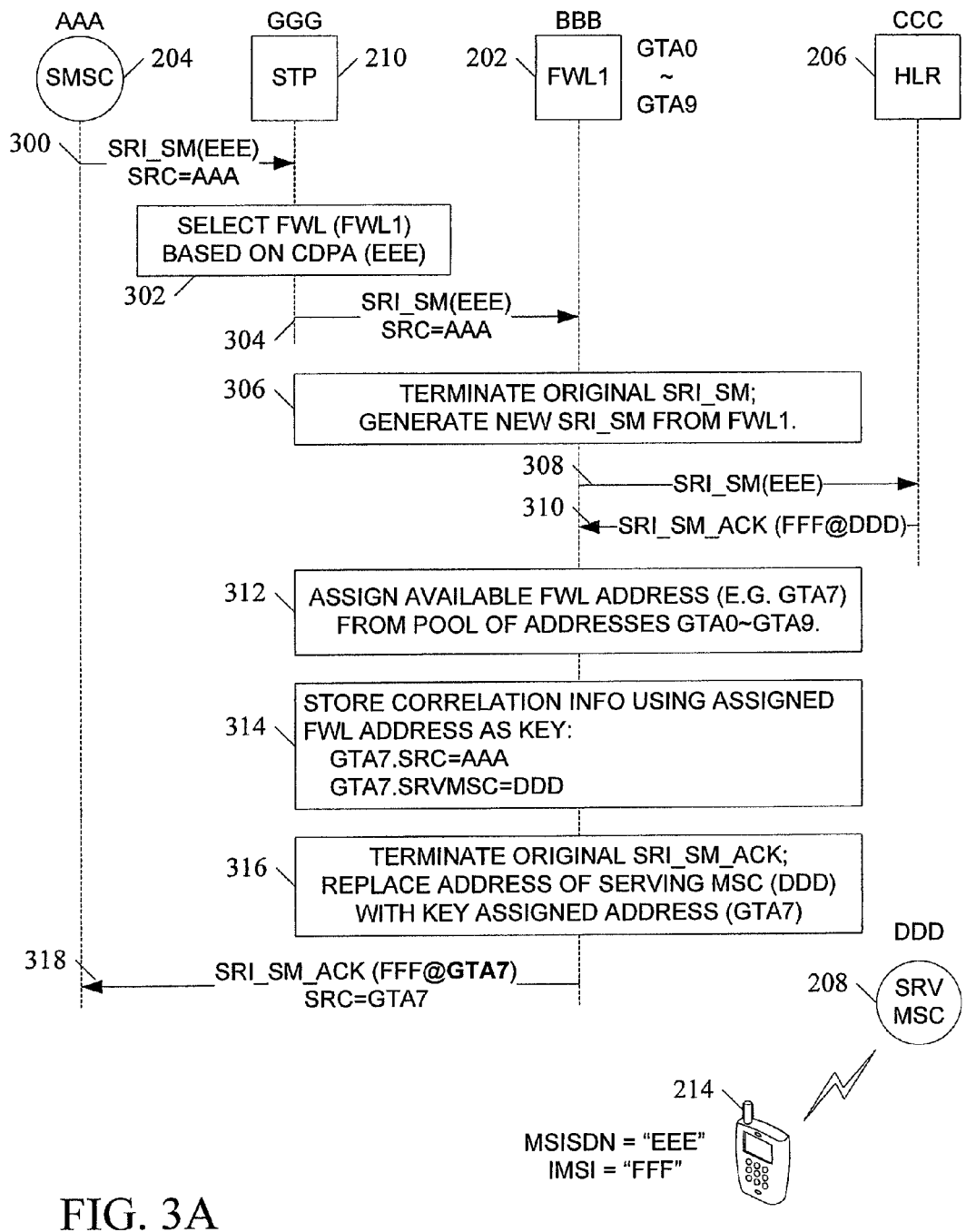
FIGS. 3A, 3B, and 3C are signaling message flow diagrams illustrating messages communicated within a system during an exemplary process for detecting and mitigating address spoofing in messaging service transactions according to an embodiment of the subject matter described herein.
Figure 3B:
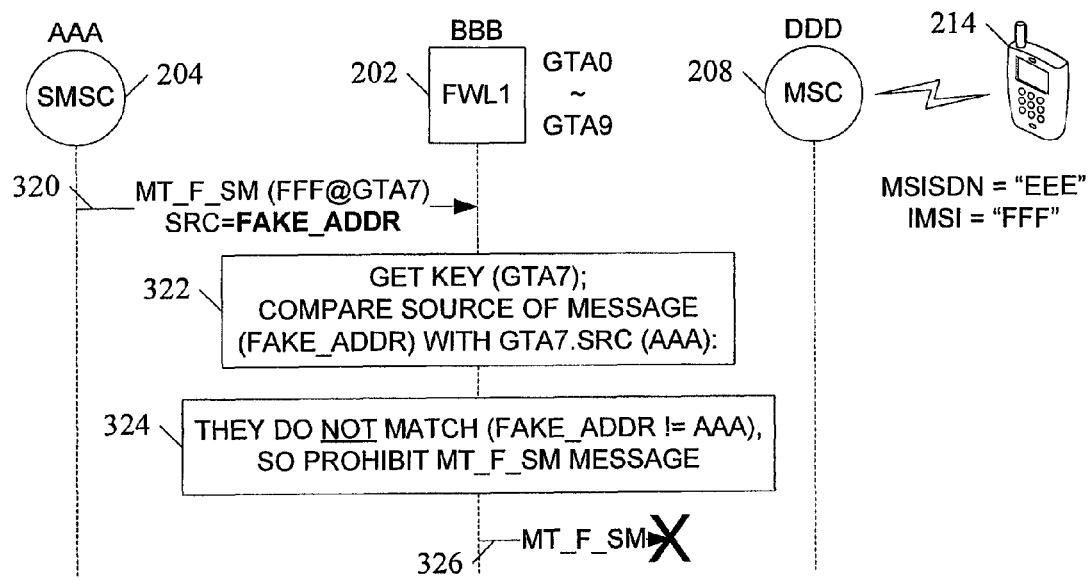
Figure 3C:
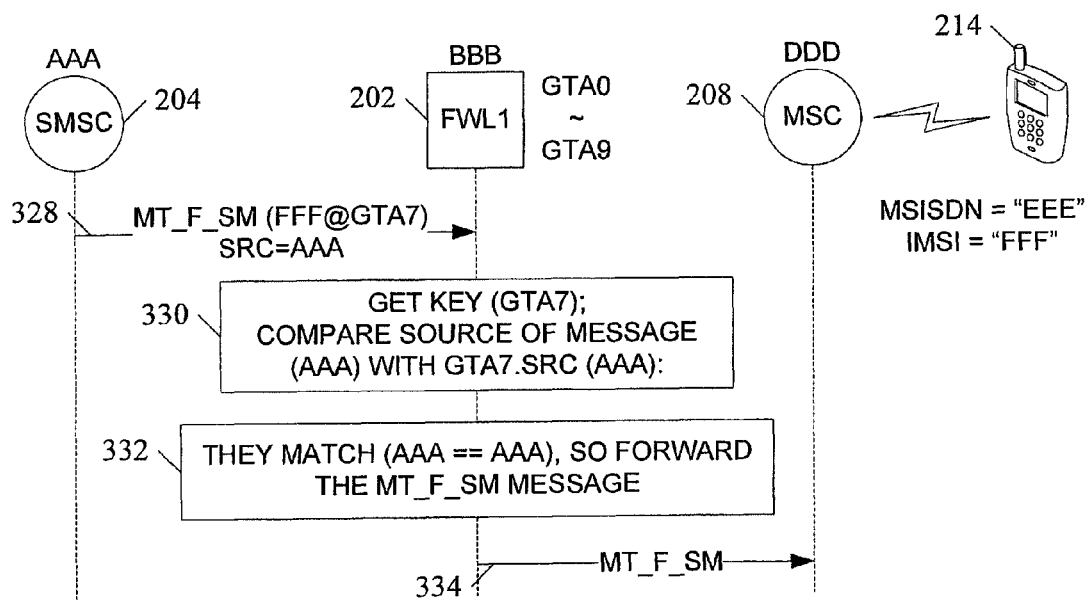

FIGS. 3A, 3B, and 3C are signaling message flow diagrams illustrating messages communicated within exemplary system 200 during a process for detecting and mitigating address spoofing in messaging service transactions according to an embodiment of the subject matter described herein. FIGS. 3A, 3B, and 3C show messages communicated between SMSC 204, STP 210, FWL1 202, HLR 206, and SRVMSC 208. These nodes are identical to their like-numbered counterparts illustrated in FIG. 2, and therefore their descriptions will not be repeated here.

Referring now to FIG. 3A, in one embodiment, SMSC 204 may send a mobility management request message 300 requesting routing information for a called party mobile subscriber, who is identified by a called party address (CDPA). In the embodiment illustrated in FIG. 3A, SMSC 204 sends a send routing information for short message (SRI_SM) message to determine the routing information for mobile subscriber MS 214, whose MSISDN number is "EEE".

In one embodiment, mobility management request message 300 may include information indicating the source of the message. In the embodiment illustrated in FIG. 3A, mobility management request message 300 includes a field or parameter called "SRC", which stores the address of SMSC 204, which has a network address of "AAA". In one embodiment, mobility management request message 300 is received or intercepted by a routing node, STP 210.

At block 302, STP 210 selects one of firewall nodes 202 based on the called party address contained within mobility management request message 300. In the embodiment illustrated in FIG. 3A, STP 210 selects FWL1, whose network address is "BBB", and forwards the SRI_SM message to FWL1, shown in FIG. 3A as message 304. In alternative embodiments, system 200 may have only one firewall node 202, in which case mobility management request message 300 may be routed to that firewall node either with or without the need for STP 210. In one embodiment, network NW2 may not include an STP.

Forwarding an unmodified SRI_SM message from FWL1 202 to HRL 206 does not guarantee that the response to the SRI_SM message, such as an SRI_SM_ACK message, will return through FWL1 202. Thus, in one embodiment, at block 306, firewall node FWL1 202 terminates SRI_SM message 304 and generates a new SRI_SM message 308, which sends to HLR 206. HLR 206 sends a reply message, SRI_SM_ACK 310, containing the IMSI number ("FEE") for MS 214 and an identity of the serving MSC ("DDD"). For brevity, the IMSI and serving MSC parameters are displayed in all figures using the format "IMSI@servingMSC". Alternatively, FWL1 202 may modify the original mobility management request message 300 in such as manner as to guarantee that the response from HLR 206 returns through FWL1 202. For example, FWL1 202 may update the source information in the routing label so that it appears to HLR 206 that the mobility management request message originated from FWL1 202.

In one embodiment, firewall node FWL1 202 has at its disposal a pool of addresses or other form of identity by which it may be identified. In the embodiment illustrated in FIG. 3A, FWL1 202 has a collection of global title addresses (GTAs), shown as values "GTA0" through "GTA9". At block 312, FWL1 202, selects an available GTA (e.g., "GTA7") to be used for a message delivery transaction, of which mobility management request message 300 is only the first part.

At block 314, FWL1 202 stores a correlation between the selected or allocated GTA and information identifying an originating SMSC. In one embodiment, FWL1 202 may store correlation information in the form of a correlation record in a table, database, or other form of data storage and retrieval. In the embodiment illustrated in FIG. 3A, FWL1 202 may use the selected GTA as a key and store the address of the originating SMSC 204 and the identity of the MSC currently serving the mobile subscriber. For example, FWL1 202 may use the key "GTA7" to store the value "AAA" in a record field labeled "SRC" and to store the value "DDD" in a record field labeled "SRVMSC". In one embodiment, firewall nodes 202 may allocate each of its available GTAs to only one correlation record at a time; allocated GTAs are then unavailable to be allocated again until the allocated GTA is deallocated or released back into the pool. A GTA may be deallocated or released as a result of various trigger conditions, such as the completion (or abandonment) of the mobility management transaction to which the GTA is associated, explicit instruction from the network operator or provisioning system, node, module, or service reset, etc.

At block 316, FWL1 202 terminates SRI_SM_ACK message 314 that it receives from HLR 206 and generates a new SRI_SM_ACK message 318, which it forwards to SMSC 204. Generated SRI_SM_ACK message 318 contains the IMSI for MS 214, i.e., "FFF", but instead of the address of SRVMSC 208, FWL1 202 replaces the actual value "DDD" with the address of the selected GTA, e.g., "GTA7". In this manner, FWL1 202 can guarantee that, as will be shown below, other messages involved in the message delivery transaction will also be routed through FWL1 202. By guaranteeing that all messages involved in the message delivery transaction are seen by the same node (e.g., FWL1 202), this ensures the opportunity to compare the address of the originating SMSC (e.g., SMSC 204) as reported in the mobility management query message with the address of the originating SMSC as reported in any subsequent message service message that is part of the same mobility management transaction. If the addresses are not the same, this is a very likely indication of spoofing. The process continues in FIGS. 3B and 3C.

FIG. 3B illustrates detection of a spoofed MT/SM message, and FIG. 3C illustrates processing of a legitimate (i.e., non-spoofed) MT/SM message. Starting with FIG. 3B, in response to receiving SRI_SM_ACK message 318 from FWL1 202, SMSC 204 now has enough information to deliver the MT/SM message. Thus, SMSC 204 may issue a mobile-terminated forward short message (MT_F_SM) message 320 to what SMSC 204 has been told is the MSC that is currently serving MS 214. Actually, MT_F_SM message 320 is addressed to FWL1 202. In the embodiment illustrated in FIG. 3B, SMSC 204 attempts to spoof the source address of the MT_F_SM message in order to avoid a termination fee from NW2. Thus, MT_F_SM message 320 includes false information, shown as "FAKE_ADDR" in FIG. 3B, in the SRC field of MT_F_SM message 320.

MT_F_SM message 320 is received by FWL1 202. At block 322, FWL1 202 extracts the key, which FWL1 202 will use to look up the correlation information, from received MT_F_SM message 320. In the embodiment illustrated in FIG. 3B, the key is "GTA7" and the value of the correlation data is the address of the source of mobility management request message 300, or "AAA". FWL1 202 may then simply compare the purported source of MT_F_SM message 320 ("FAKE_ADDR") with the source of the associated mobility management request message 300 ("AAA"), and determine that MT_F_SM message 320 has a spoofed address. As shown in block 324 of FIG. 3B, FWL1 202 may then discard the MT_F_SM message or otherwise prohibit it from being forwarded to SRVMSC 208.

FIG. 3C illustrates processing of a legitimate (i.e., non-spoofed) MT/SM message. In FIG. 3C, in response to receiving SRI_SM_ACK message 318 from FWL1 202, SMSC 204 now has enough information to deliver the MT/SM message. Thus, SMSC 204 may issue a mobile-terminated forward short message (MT_F_SM) message 328 to what SMSC 204 has been told is the MSC that is currently serving MS 214. Actually, MT_F_SM message 328 is addressed to FWL1 202. In the embodiment illustrated in FIG. 3C, MT_F_SM message 328 is a legitimate MT/SM message that contains the true identity of the source SMSC 204: the "SRC" field contains the address of SMSC 204, which is "AAA".

MT_F_SM message 328 is received by FWL1 202. At block 330, FWL1 202 extracts the key, which FWL1 202 will use to look up the correlation information, from received MT_F_SM message 328. In the embodiment illustrated in FIG. 3C, the key is "GTA7" and the correlation data associated with that key is the address of the source of mobility management request message 300 ("AAA"), and the identity of the MSC currently serving MS 214 ("DOD"). FWL1 202 may then simply compare the purported source of MT_F_SM message 328 ("AAA") with the source of the associated mobility management request message 300 ("AAA"), and determine that MT_F_SM message 328 is legitimate. FWL1 202 may then forward the legitimate message 334 to currently serving MSC 208.

Figure 4A:
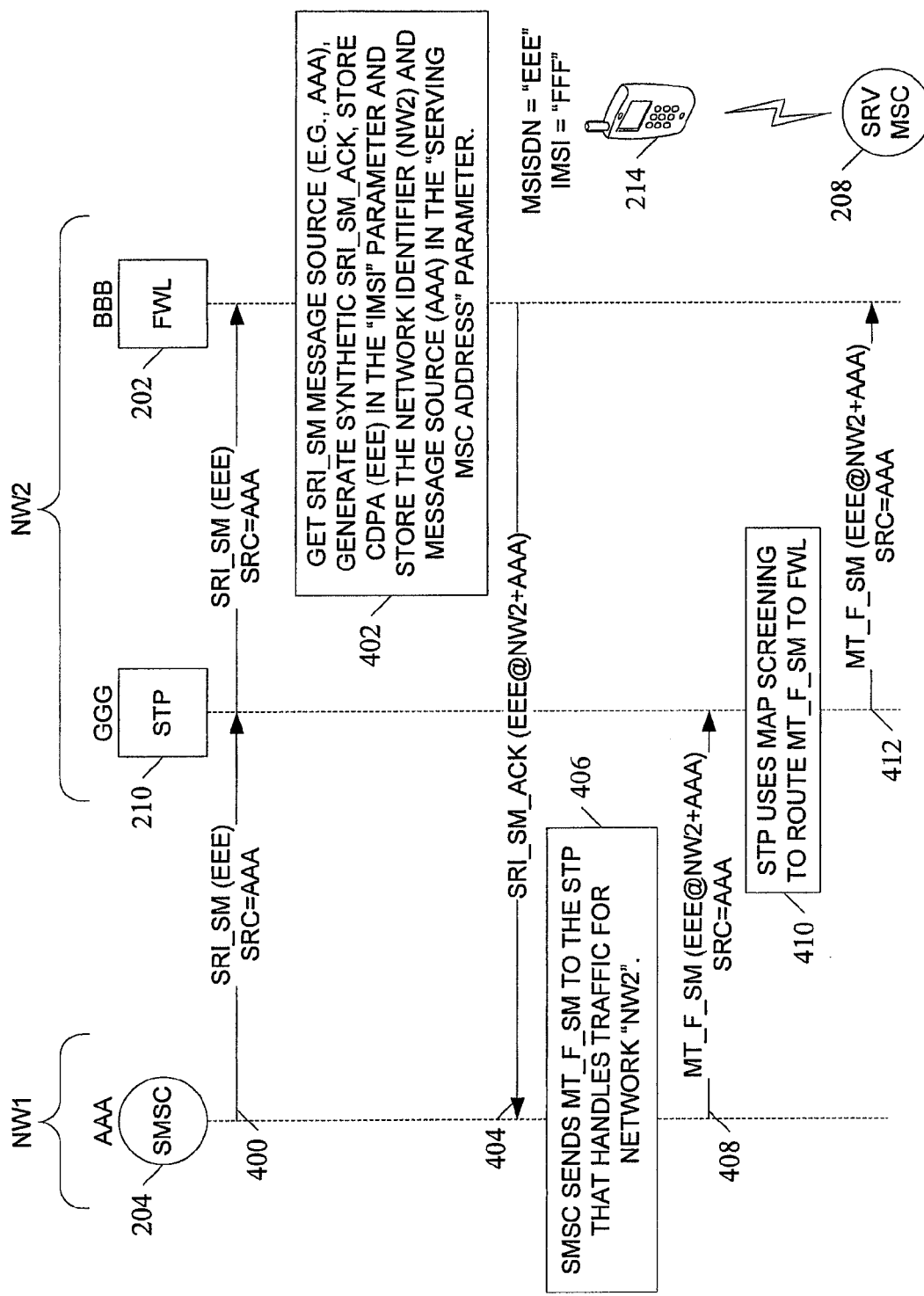
FIGS. 4A and 4B are signaling message flow diagrams illustrating messages communicated within a system during an exemplary process for detecting and mitigating address spoofing in messaging service transactions according to another embodiment of the subject matter described herein.
Figure 4B:
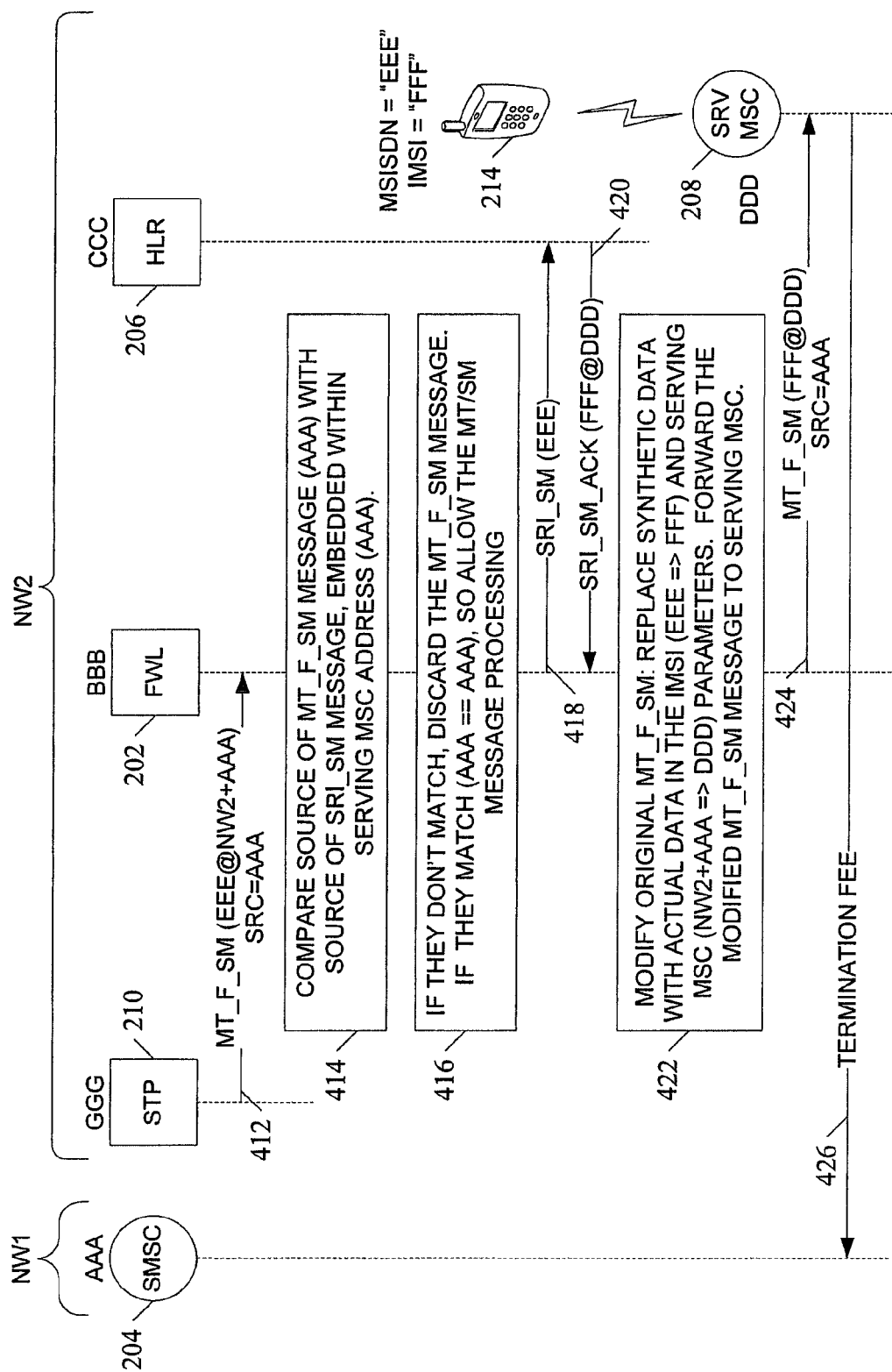

FIGS. 4A and 4B are signaling message flow diagrams illustrating messages communicated within exemplary system 200 during a process for detecting and mitigating address spoofing in messaging service transactions according to another embodiment of the subject matter described herein. FIGS. 4A and 4B show messages communicated between SMSC 204, STP 210, FWL1 202, HLR 206, and SRVMSC 208. These nodes are identical to their like-numbered counterparts illustrated in FIG. 2, and therefore their descriptions will not be repeated here.

In the embodiment illustrated in FIGS. 4A and 4B, MT/SM spoofing detection and mitigation is accomplished without the need to store correlation data. Instead, a firewall node responds to a mobility management query, such as an SRI_SM or similar, with what is herein referred to as a "synthetic" response. A synthetic response is a mobility management query response, such as an SRI_SM_ACK or similar, that appears to be a real response but which does not contain real data. Instead, the synthetic response is constructed in such as way as to guarantee that any subsequent mobility management message that is associated with the first mobility management request will: a) be directed to the same firewall that created and issued the synthetic response, and b) include information that identifies the original mobility management request.

In other words, rather than storing correlation data within the firewall node, the firewall node stores the correlation data in the synthetic response itself, and presumes that when a subsequent mobility management message, such as a mobility service request, arrives, the subsequent mobility management message will contain the correlation data that the firewall node needs to perform spoofing detection and mitigation. This process will now be described in detail using FIGS. 4A and 4B.

In one embodiment, an SMSC may send a mobility management request message requesting routing information for a called party mobile subscriber, such as MS 214, identified by MSISDN number ("EEE"). In the embodiment illustrated in FIG. 4A, SMSC 204 sends SRI_SM message 400, the message requesting routing information for mobile subscriber MS 214, whose MSISDN number is "EEE". SRI_SM message 400 is received and routed by STP 210, which directs SRI_SM message 400 to firewall node, FWL 202.

At block 402 in FIG. 4A, FWL 202 does not forward the SRI_SM message to an HLR, but instead generates a synthetic response message, SRI_SM_ACK message 404. A real SRI_SM_ACK message would return the IMSI number of the mobile subscriber called party, and an identifier of the MSC currently serving the mobile subscriber called party. In the embodiment illustrated in FIG. 4A, for example, a real SRI_SM_ACK message would return an IMSI value of "FFF" and a serving MSC identifier of "DDD". Instead, FWL 202 creates a synthetic SRI_SM_ACK message 404 that stores the MSISDN number from SRI_SM message 400 in the IMSI field and stores the address of the source of SRI_SM message 400 in the serving MSC field.

However, FWL 202 cannot completely replace the contents of the serving MSC identifier (e.g., address "DDD") with the address of the source of SRI_SM message 400 (e.g., address "AAA"), because the serving MSC identifier is subsequently used by SMSC 204 as the destination for the message service request. If synthetic SRI_SM_ACK message 404 included address AAA in the serving MSC field, a subsequent MT_F_SM message would be delivered back to SMSC 204.

To overcome this problem, only a portion of the serving MSC address field in synthetic SRI_SM_ACK message 404 contains the address of the source of the SRI_SM message 400. In one embodiment, the serving MSC address is an MSISDN number, of the format shown below:

CC: NDC: SN where CC=country code, NDC=network destination code, and SN=subscriber number. The CC and NDC fields must contain values that are correct for FWL 202, so that the subsequent messaging service message is directed to the correct country and network to which FWL 202 belongs. This leaves only the SN field, which FWL 202 uses to store the address "AAA". In one embodiment, only a portion of address AAA is stored in the SN portion of the serving MSC field; as will be seen below, this is enough information to detect spoofing. In another embodiment, also described below, the various pieces of information needed for correlation and spoofing detection may be combined, encrypted, and/or compressed to fit into the available spaces of the IMSI and serving MSC fields within synthetic SRI_SM_ACK message 404.

Referring again to FIG. 4A, block 402, FWL 202 issues synthetic SRI_SM_ACK message 404 with the IMSI field containing value "EEE" (the MSISDN number for MS 214) and the serving MSC field containing a first portion that identifies the network to which FWL 202 belongs (shown as "NW2" in FIG. 4A) and a second portion that identifies the source of SRI_SM message 400 (shown as "AAA" in FIG. 4A). This information is represented as "EEE@NW2+AAA" in FIG. 4A.

At block 406, SMSC 204 receives synthetic SRI_SM_ACK message 404 and uses the IMSI@servingMSC information to issue a message service request message to what it believes to the serving MSC. In the embodiment illustrated in FIG. 4A, SMSC 204 issues MT_F_SM message 408 to the address "NW2+AAA". However, as described above, address "NW2+AAA" is not a real address; but the "NW2" portion of the address is enough for SMSC 204 to know that MT_F_SM message 408 must be routed first to STP 210, which receives MT_F_SM message 408.

At block 410, STP 210 uses MAP filtering to determine that MT_F_SM message 408 is a mobility management service message, and therefore forwards the message to FWL 202. The forwarded MT_F_SM message 412 is thus guaranteed to go to the same firewall node that received and processed the original mobility management query message (e.g., SRI_SM message 400) that is associated with the subsequent mobility management service message (e.g., MT_F_SM message 404.)

The process continues in FIG. 4B. Upon receipt of forwarded MT_F_SM message 412, FWL 202 determines the source of MT_F_SM message 412 with the information, stored in the serving MSC field, that identifies the source of SRI_SM message 400, as shown in block 414. In the embodiment illustrated in FIG. 3B, FWL 202 determines that MT_F_SM message 412 came from SMSC 204 (identified by address "AAA") and that the source of SRI_SM message 400 was also SMSC 204, because the serving MSC field of MT_F_SM message 412 also contains the value "AAA". At block 416, FWL 202 compares the two values, determines that they match (AAA==AAA), and thus determines that MT_F_SM message 412 is not spoofed. Had the two values not matched, FWL 202 would determine that MT_F_SM message 412 was spoofed, and would have discarded MT_F_SM message 412, and the process would have ended there.

Since, in the embodiment illustrated in FIG. 4B, MT_F_SM message 412 is authentic, FWL 202 now performs all of the necessary steps for SMS message delivery. First, FWL 202 queries HLR 206 for the location of MS 214 (SRI_SM message 418) and gets a response (SRI_SM_ACK message 420). Second FWL 202 modifies MT_F_SM message 412 to include the authentic IMSI number and serving MSC identifier (e.g., FFF@DDD) and forwards the modified MT_F_SM message 424 to the correct serving MSC, SRVMSC 208. The serving MSC may then issue a termination fee 426 to the originating SMSC 204.

It may be desirable to obscure the fact that the SRI_SM_ACK message that FWL 202 sends to SMSC 204 is synthetic. Thus, in one embodiment, the correlation data that FWL 202 stores in the IMSI and serving MSC fields of synthetic SRI_SM_ACK message 404 may be encrypted. This is illustrated in FIG. 5.

Figure 5:
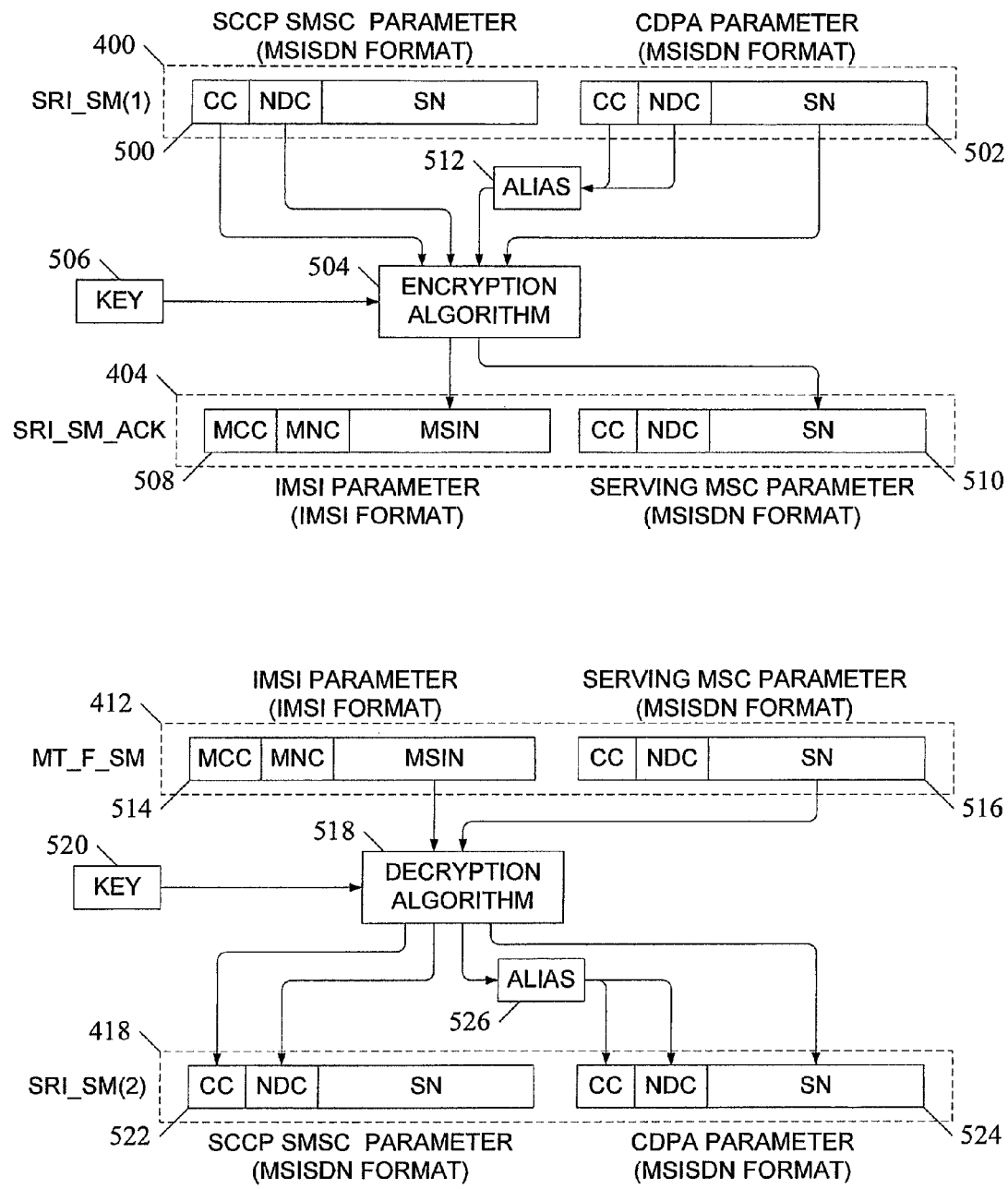
FIG. 5 is a block diagram illustrating a method for encrypting the data necessary for detecting and mitigating address spoofing in messaging service transactions according to an embodiment of the subject matter described herein.

FIG. 5 is a block diagram illustrating a method for encrypting the data necessary for detecting and mitigating address spoofing in messaging service transactions according to an embodiment of the subject matter described herein. FIG. 5 illustrates in more detail selected parameters of SRI_SM message 400, synthetic SRI_SM_ACK message 404, MT_F_SM message 412, and SRI_SM message 418, from FIGS. 4A and 4B.

In one embodiment, FWL 202 receives SRI_SM message 400, which includes two parameters: the SCCP SMSC (SRC) parameter 500, which is in MSISDN format, and the called party (CDPA) parameter 502, also in MSISDN format. FWL 202 uses the country code (CC) and network destination code (NDC) fields of SRC parameter 500 and all of the fields of CDPA parameter 502 as input into an encryption algorithm 504. Encryption algorithm 504 may also require an encryption key 506 as input. The output of encryption algorithm 504 is used to generate synthetic SRI_SM_ACK message 404, which has two parameters: the IMSI number (IMSI) parameter 508 and the serving MSC (SRVMSC) parameter 510. IMSI parameter 508 is in the IMSI format, which includes the following fields:

MCC:MNC:MSIN where MCC=mobile country code, MNC=mobile network code, and MSIN=mobile subscriber identity number. SRVMSC parameter 510 is in the MSISDN format.

In the embodiment illustrated in FIG. 5, the output of encryption algorithm 504 includes data that will be placed into the MSIN field of IMSI parameter 508 and the SN field of SRVMSC parameter 510. As described above, the CC and NDC fields of SRVMSC parameter 510 must contain CC and NDC values that will cause the subsequent MT_F_SM message 412 to be routed to the network to which FWL 202 belongs, so that FWL 202 will receive subsequent MT_F_SM message 412. In one embodiment, the CC and NCD fields of CDPA parameter 502 may be compressed or replaced with an alias 512 to save space.

FIG. 5 also illustrates in detail the parameters within MT_F_SM message 412, which also includes an IMSI parameter 514 and a SRVMSC parameter 516. If MT_F_SM message 412 is related to SRI_SM_ACK message 404, the contents of IMSI parameter 514 should be the same as IMSI parameter 508 and the contents of SRVMSC parameter 516 should be the same as SRVMSC parameter 510. In response to receiving MT_F_SM message 412, FWL 202 will extract information from the MSIN field of IMSI parameter 514 and the SN field of SRVMSC parameter 516, and use them as input into a decryption algorithm 518. Decryption algorithm 518 may also use a decryption key 520, which may be the same key or a different key from encryption key 506, depending on whether the encryption algorithm is symmetric or asymmetric, respectively.

In the embodiment illustrated in FIG. 5, the output of decryption algorithm 518 includes data that will be placed into the CC, NDC, and SN fields of SCCP SMSC (SCR) parameter 522 and into the CC and NDC fields of SRVMSC parameter 524 of SRI_SM message 418. In one embodiment, the output of decryption algorithm 518 may include an alias 526 which must be decompressed or mapped to a set of data for the CC and NDC fields of IMSI parameter 522. In this manner, the correlation data stored by FWL 202 in various fields within SRI_SM_ACK message 404 will return to FWL 202 via the equivalent fields of MT_F_SM message 412. From the recovered correlation data, FWL 202 has enough information to reconstruct its own SRI_SM message 418, which it will send to HLR 206.

To detect spoofing, FWL 202 can compare the SCCP SMSC parameter 522, which stores information indicating the source of original SRI_SM message 400, with the contents of the SCCP SMSC parameter for MT_F_SM message 412 (not shown in FIG. 5). If the two values are the same, MT_F_SM message 412 is legitimate.

In some systems, however, the entity that sends the original SRI_SM message may be different from the entity that sends the subsequent MT_F_SM message. Alternatively, the same entity may send both messages but that entity may be a cluster of nodes, or a single node that uses multiple addresses. In these scenarios, the contents of SCCP SMSC parameter 522 may not be exactly the same as source address of MT_F_SM message 412. However, since the purpose of spoofing is usually to redirect a termination fee from the originating network to a third network, comparing only the CC and NDC fields of the two addresses is enough to determine whether or not MT_F_SM message 412 is spoofed.

The embodiment illustrated in FIG. 5 is for illustration purposes and is not intended to be limiting. For example, encryption algorithm 504 and decryption algorithm 518 may use fields or portions of fields other than those illustrated in FIG. 5. Also, other means of obscuring the fact that SRI_SM_ACK message 404 is synthetic or obscuring the data contained within SRI_SM_ACK message 404 is contemplated, including compression of data, mapping of data, etc.

It will be understood that various details of the subject matter described herein may be changed without departing from the scope of the subject matter described herein. For example, the methods and systems described herein are not limited to SMS messages, but may apply to other messaging services, such as multimedia messaging services (MMS), may also apply to other mobility management related services, and may also apply to other telecommunication services that first locate a called party and then send data to that called party. Furthermore, the foregoing description is for the purpose of illustration only, and not for the purpose of limitation.

What is claimed is:

1. A method for detecting and mitigating address spoofing in a messaging service transaction, the method comprising:
    at a messaging service firewall separate from a short message service center (SMSC) and implemented on a platform including at least one processing device:
        receiving a mobility management reply message that is sent by a mobile location register element in response to an associated mobility management query, the mobility management query and the mobility management reply message being associated with a mobility management transaction, the mobility management reply message including a message service recipient identifier and a serving switch identifier;
        allocating a global title address (GTA) from a pool of global title addresses within a range of global title addresses assigned to the firewall to a correlation record;
        storing the correlation record indicating a correlation between the allocated GTA and an originating SMSC identifier of the mobility management query;
        replacing the serving switch identifier in the mobility management reply message with the allocated GTA resulting in a modified mobility management reply message;
        routing the modified mobility management reply message;
        receiving a message service message associated with the mobility management transaction, the messaging service message being addressed to the allocated GTA;
        determining the originating SMSC identifier to which the allocated GTA is correlated;
        comparing SMSC identifier information extracted from the messaging service message with the originating SMSC identifier to which the allocated GTA is correlated to determine if the messaging service message contains spoofed address information; and
        in response to determining that the messaging service message contains spoofed address information, discarding the messaging service message.

2. The method of claim 1 comprising generating a message detail record based on an attempted delivery of the message service message.

3. A method for detecting and mitigating address spoofing in a messaging service transaction, the method comprising:
    at a messaging service firewall separate from a short message service center (SMSC) and implemented on a platform including at least one processing device:
        receiving a mobility management query message associated with a message delivery transaction that is sent by an originating SMSC element, where the mobility management query message includes a message service recipient identifier and a first originating SMSC identifier;
        generating a mobility management reply message in response to the query message, the reply message including at least a portion of the first originating SMSC identifier in one or more parameters of the reply message that trigger the originating SMSC to echo the parameters in a subsequent message associated with the message delivery transaction;
        receiving a messaging service message associated with the message delivery transaction, where the messaging service message includes the echoed parameters;

extracting the echoed parameters from the messaging service message;
comparing SMSC identifier information in the echoed parameters extracted from the messaging service message with SMSC identifier information contained in a routing label of the received messaging service message to determine if the messaging service message contains spoofed address information; and
in response to determining that the messaging service message contains spoofed address information, discarding the messaging service message.

4. The method of claim 3 comprising generating a message detail record based on an attempted delivery of the message service message.

5. The method of claim 3 wherein receiving the messaging service message associated with the message delivery transaction comprises receiving the messaging service message from a signaling message routing node that uses mobile application part (MAP) screening to route received messaging service messages.

6. A system for detecting and mitigating address spoofing in messaging service transactions, the system comprising:
a messaging service firewall separate from a short message service center (SMSC) and implemented on a platform including at least one processing device, the messaging service firewall including:
a network interface for sending and receiving signaling messages; and
a spoofing detection module for:
receiving, from the network interface, a mobility management reply message that is sent by a mobile location register element in response to an associated mobility management query, the mobility management query and the mobility management reply message being associated with a mobility management transaction, where the mobility management reply message includes a message service recipient identifier and a serving switch identifier;
allocating a global title address (GTA) from a pool of global title addresses within a range of global title addresses assigned to the firewall to a correlation record;
generating and storing the correlation record that associates the allocated GTA with an originating SMSC identifier of the mobility management query;
replacing the serving switch identifier in the reply message with the allocated GTA resulting in a modified reply message;
routing the modified reply message;
receiving, from the network interface, a message service message including the allocated GTA and using the allocated GTA to locate the correlation record;
comparing SMSC identifier information extracted from the messaging service message with SMSC identifier information contained in the correlation record to determine If the messaging service message contains spoofed address information; and
in response to determining that the messaging service message contains spoofed address information, discarding the messaging service message.

7. The system of claim 6 wherein the messaging service firewall generates a message detail record based on an attempted delivery of the message service message.

8. A system for detecting and mitigating address spoofing in messaging service transactions, the system comprising:
a messaging service firewall separate from a short message service center (SMSC) and implemented on a platform including at least one processing device, the messaging service firewall including:
a network interface for sending and receiving signaling messages; and
a spoofing detection module for:
receiving, from the network interface, a mobility management query message associated with a message delivery transaction that is sent by an originating SMSC element, where the mobility management query message includes a message service recipient identifier and a first originating SMSC identifier;
generating a mobility management reply message, in response to the query message, that includes at least a portion of the first originating SMSC identifier in one or more parameters of the reply message that trigger the originating SMSC to echo the parameters in a subsequent message associated with the message delivery transaction;
receiving, from the network interface, a messaging service message associated with the message delivery transaction, where the messaging service message includes the echoed parameters;
extracting the echoed parameters in the messaging service message;
comparing SMSC identifier information in the echoed parameters extracted from the messaging service message with SMSC identifier information contained in a routing label of the received messaging service message to determine if the messaging service message contains spoofed address information; and
in response to determining that the messaging service message contains spoofed address information, discarding the messaging service message.

9. The system of claim 8 wherein the messaging service firewall generates a message detail record based on an attempted delivery of the message service message.

10. The system of claim 8 comprising a signaling message routing node that uses mobile application part (MAP) screening to route messaging service messages to the messaging service firewall.

11. A non-transitory computer readable medium having stored thereon executable instructions that when executed by the processing device of a computer control the computer to perform steps comprising:
at a messaging service firewall separate from a short message service center (SMSC) and implemented on a platform including at least one processing device:
receiving a mobility management reply message that is sent by a mobile location register element in response to an associated mobility management query, the mobility management query and the mobility management reply message being associated with a mobility management transaction, where the mobility management reply message includes a message service recipient identifier and a serving switch identifier;
allocating a global title address (GTA) from a pool of global title addresses within a range of global title addresses assigned to the firewall to a correlation record;
generating and storing the correlation record that associates the allocated GTA with an originating SMSC identifier of the mobility management query;

replacing the serving switch identifier in the reply message with the allocated GTA resulting in a modified reply message;

routing the modified reply message;

receiving the message service message including the allocated GTA and using the allocated GTA to locate the correlation record;

comparing SMSC identifier information extracted from the messaging service message with SMSC identifier information contained in the correlation record to determine if the messaging service message contains spoofed address information; and in response to determining that the messaging service message contains spoofed address information, discarding the messaging service message.

12. A non-transitory computer readable medium having stored thereon executable instructions that when executed by the processing device of a computer control the computer to perform steps comprising:

at a messaging service firewall separate from a short message service center (SMSC) and implemented on a platform including at least one processing device:

receiving a mobility management query message associated with a message delivery transaction that is sent by an originating SMSC element, where the mobility management query message includes a message service recipient identifier and a first originating SMSC identifier;

generating a mobility management reply message, in response to the query message, that includes at least a portion of the first originating SMSC identifier in one or more parameters of the reply message that trigger the originating SMSC to echo the parameters in a subsequent message associated with the message delivery transaction;

receiving a messaging service message associated with the message delivery transaction, where the messaging service message includes the echoed parameters;

extracting the echoed parameters in the messaging service message;

comparing SMSC identifier information in the echoed parameters extracted from the messaging service message with SMSC identifier information contained in a routing label of the received messaging service message to determine if the messaging service message contains spoofed address information; and in response to determining that the messaging service message contains spoofed address information, discarding the messaging service message.

\* \* \* \* \*